United States Patent [19]

Mikami et al.

[11] Patent Number: 4,653,014

[45] Date of Patent: Mar. 24, 1987

[54] PROCESS FOR PREPARING DISCRIMINATION CRITERIA FOR A IDENTIFYING COLORS FOR COLOR IDENTIFYING SYSTEM

[75] Inventors: Kazuo Mikami; Masahiro Nishimura, both of Kyoto; Noriyuki Tsukiyama; Seisuke Hinoda, both of Uji, all of Japan

[73] Assignee: Omron Tateisi Electronics Co., Kyoto, Japan

[21] Appl. No.: 700,469

[22] Filed: Feb. 11, 1985

[30] Foreign Application Priority Data

Feb. 13, 1984 [JP] Japan .................................. 59-25534

[51] Int. Cl.[4] .................... G01J 3/50; G01N 21/27; G06F 15/20
[52] U.S. Cl. ................................. 364/526; 356/406; 250/226
[58] Field of Search ............... 364/526; 356/405, 406, 356/407; 250/226

[56] References Cited

U.S. PATENT DOCUMENTS 3,896,312  7/1975  Brown et al. ...................... 364/526
3,924,244  12/1975  Seitz .............................. 364/526 X
4,414,635  11/1983  Gast et al. ........................ 364/526

Primary Examiner—William B. Perkey
Attorney, Agent, or Firm—Stevens, Davis, Miller & Mosher

[57] ABSTRACT

A process for preparing discrimination criteria for color identification comprises reading values representing a plurality of color components delivered from a color sensor for each of a plurality of given reference colors, calculating relative values of the color components, calculating relative values of the color components, calculating the deviation of the relative value of each color component from a specified value, extracting pairs of deviations each having a discrimination distance of at least specified times relative to any other reference color, determining a discrimination criterion between the extracted pair of deviation, and repeating the extracting and determining steps by calculating deviations of higher order with use of the deviations until discrimination criteria are determined for all the given reference colors.

8 Claims, 10 Drawing Figures

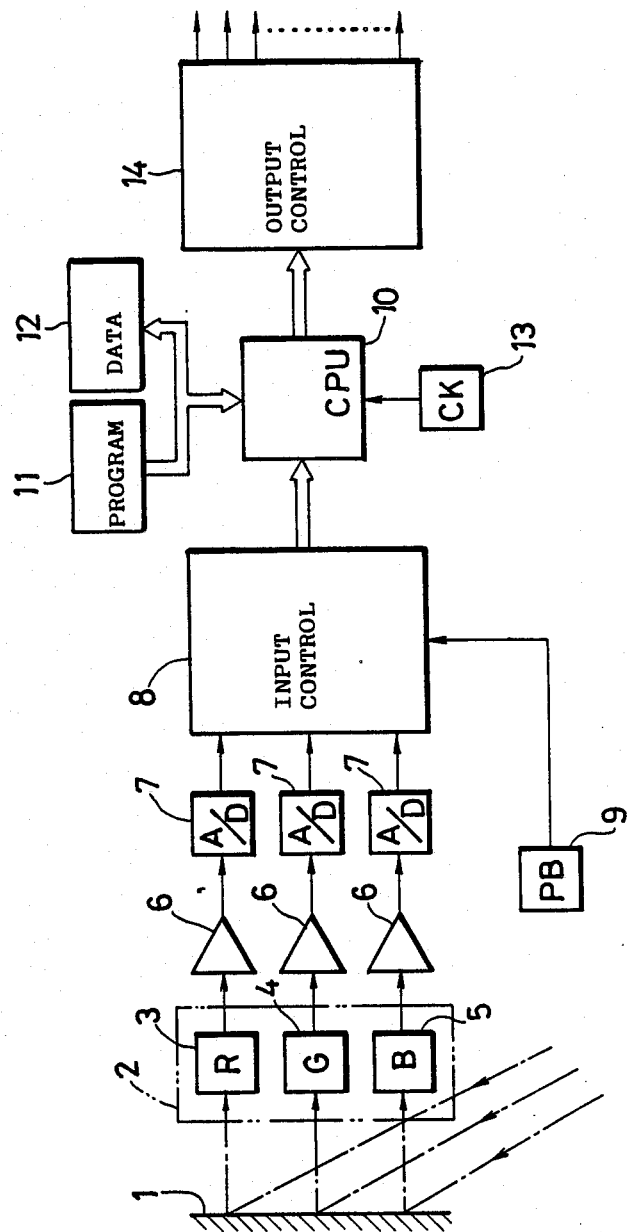

FIG.2a

| COLOR | X | Y | Z | S | X1 | Y1 | Z1 | X2 | Y2 | Z2 |
|---|---|---|---|---|---|---|---|---|---|---|
| RED | 325 | 109 | 129 | 563 | MAX 57.7 | MIN 19.4 | 22.9 | +15.3 | -7.1 | -13.3 |
| ORANGE | 340 | 131 | 138 | 609 | 55.8 | 21.5 | 22.7 | +13.4 | -5 | -13.5 |
| YELLOW | 360 | 208 | 162 | 730 | 49.3 | 28.5 | MIN 22.2 | +6.9 | +2 | -14 |
| YELLOWISH GREEN | 237 | 174 | 131 | 542 | 43.7 | 32.1 | 24.2 | +1.3 | +5.6 | -12 |
| GREEN | 68 | 74 | 78 | 220 | 30.9 | MAX 33.6 | 35.5 | -11.5 | +7.1 | -0.7 |
| BLUE | 52 | 44.3 | 96.5 | 192.8 | MIN 27.0 | 23.0 | MAX 50.1 | -15.4 | -3.5 | +13.9 |
| PURPLE | 123 | 70.5 | 121 | 314.5 | 39.1 | 22.4 | 38.5 | -3.3 | -4.1 | +2.3 |
| WHITE | 360 | 234 | 261 | 855 | 42.1 | 27.4 | 30.5 | -0.3 | +0.9 | -5.7 |
| BLACK | 32.0 | 20.0 | 24.0 | 76 | 42.1 | 26.3 | 31.6 | -0.3 | -0.2 | -4.6 |

FIG.2b

| X3 (POSITIVE GROUP) | X4 (NEGATIVE GROUP) | Y3 (POSITIVE GROUP) | Y4 (NEGATIVE GROUP) | Z3 (POSITIVE GROUP) | Z4 (NEGATIVE GROUP) | DISCRIMINATION CRITERION |
|---|---|---|---|---|---|---|
| +7 | | | -3.45 | | -7.35 | $Y4 < -2.4$ |
| +5.1 | | | -1.35 | | -7.55 | $-0.9 > Y4 > -2.4$ |
| -1.4 | | -2.55 | | | -8.05 | $0 > X3 > -4.2$ |
| -7 | | +1.03 | | | -6.05 | $X3 < -4.2$ |
| | -3.65 | +2.25 | +0.15 | | +5.25 | $Z4 > +3.3$ |
| | -7.55 | | | | | $Z2 > +8.1$ |
| | +4.55 | -3.65 | -0.45 | | | $0 < Z2 < +8.1$ |
| | +7.55 | | | | +0.25 | $0 < Z4 < +0.8$ |
| | +7.55 | | +3.45 | | +1.35 | $Y4 > +1.8$ |

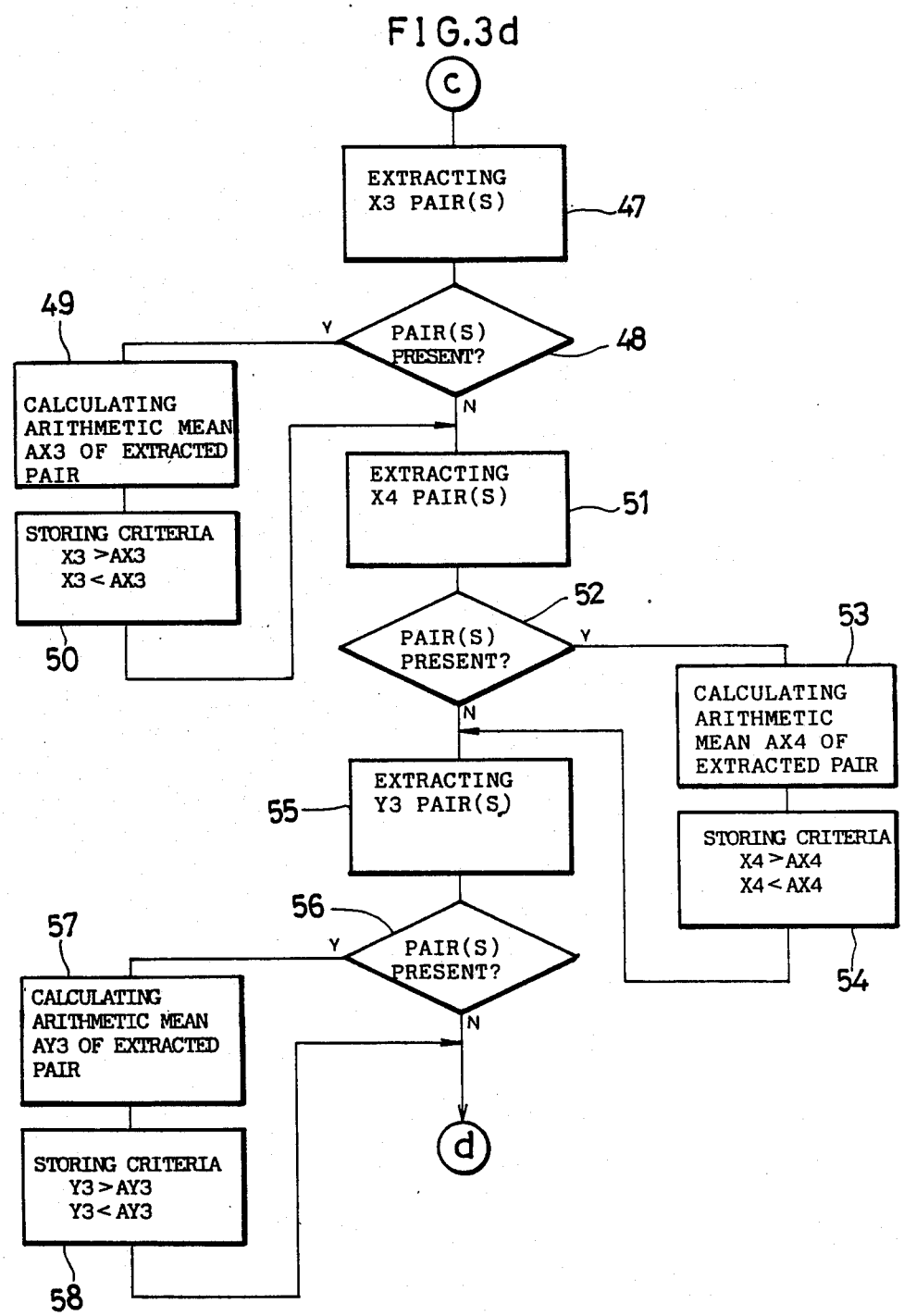

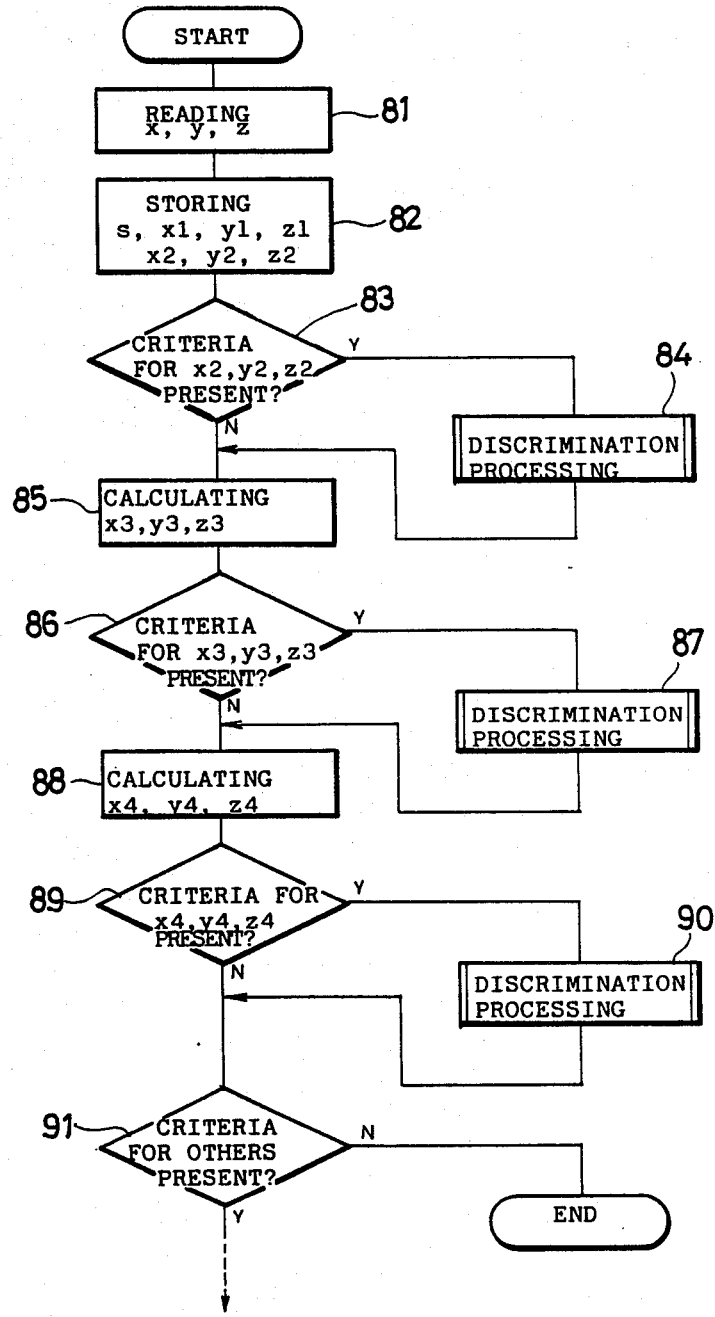

PROCESS FOR PREPARING DISCRIMINATION CRITERIA FOR A IDENTIFYING COLORS FOR COLOR IDENTIFYING SYSTEM

BACKGROUND OF THE INVENTION

The present invention relates to a process for preparing discrimination criteria for identifying colors for use in a color identifying system.

Color identifying systems are adapted to identify the color of an object by measuring the intensities of different color components of the light reflected from or passing through the object and comparing the measured intensity values of the color components with a predetermined discrimination criteria. In general, three colors, i.e. red (R), green (G) and blue (B), are used as the color components. The object is irradiated with the light from a light source. To compensate for the variation of the intensity of the light from the light source, the sum $S=R+G+B$ of the R, G and B component values are calculated, and the ratios of the components to the sum, R/S, G/S and B/S, are determined. These relative values of the color components are used as base data for identifying the color.

As to one or a plurality of colors serving as references for color identification, the above-mentioned relative values of the color components are determined. Discrimination criteria for color identification are determined with use of the relative values and are set in the system. In determining the discrimination criteria for accurate color identification, it is said to be preferable to assure at least a twofold discrimination distance. For example, when the R/S value of a color (assumed to be A color) is 50, and the R/S value of another color (B color) is 20, 50 is more than twice 20, so that there is at least a two-fold discrimination distance between A color and B color as to the R/S value. Accordingly, when a value between 50 and 20, e.g. 35, is used as a discrimination reference value, A color can be discriminated from B color with use of the R/S values, whereby accurate color identification can be accomplished.

However, when a third color (assumed to be C color) must be identified at the same time, such a simple procedure can not be used. For example, when the R/S value of C color is 30, the discrimination distance between 50 and 30 or between 30 and 20 is not greater than two times. Although it is of course possible to identify A, B and C colors with use of the R/S values with reference to 40 which is a value between 50 and 30 and to 25 which is a value between 30 and 20, erroneous discrimination is then likely to result. In such a case, it will become necessary to utilize other components, i.e. G/S and B/S values.

Colors as small as about 3 in number can be easily identified with use of the three components of R/S, G/S and B/S with at least twofold discrimination distances assured. Nevertheless, colors as many as five colors or ten colors require considerably complicated discrimination criteria and color discriminants and yet can not always be accurately identified. Further such color discriminating criteria are greatly governed by the colors to be identified, the object, other environmental conditions, etc. and must be suitably determined by the operator for the particular color identifying system used. The criteria must be prescribed in a manual. Thus, a very cumbersome procedure is needed. Moreover, the manual needs to cover delicate conditions, such that even the slightest errors in condition setting could not infrequently influence the result of color identification greatly. Furthermore, more complicated color identifying conditions require a correspondingly longer period of time for color identification, making it difficult to achieve an increased processing speed. Even when a greater variety of color components are extracted, similar problems are inevitably encountered, and there arises a need to use a sensor of correspondingly increased size, which is objectionable.

SUMMARY OF THE INVENTION

An object of the present invention is to provide a process for automatically preparing discrimination criteria for color identification with use of a computer, with discrimination distances of at least two times assured, even if a large number of colors are to be identified.

The present invention provides a process for preparing discrimination criteria for color identification characterized by the steps of reading values representing a plurality of color components delivered from a color sensor for each of a plurality of given reference colors, calculating relative values of the color components, calculating the deviation of the relative value of each color component from a specified value, extracting pairs of deviations each having a discrimination distance of at least specified times relative to any other reference color, determining a discrimination criterion between the extracted pair of deviation, and repeating the extracting and determining steps by calculating deviations of higher order with the use of the deviations until discrimination criteria are determined for all the given reference colors.

The relative values of the color components can be easily obtained by calculating the sum of values representing the color components and calculating the ratios of the component representing values to the sum. A certain color component may be used as a basis in place of the sum whereby: ratios based on the value of that component are used. Usable as the specified value for calculating the deviation is the arithmetic or geometrical mean of the maximum and minimum of the color component concerned. Also usable as the specified value is a value obtained by subtrating a value from the minimum, or multiplying a given percentage by the minimum. At least twofold discrimination distances are preferable to use.

The present process automatically provides discrimination criteria automatically for color identification, with the use of a computer whatever reference colors are used, even when a wide variety of reference colors are used. The process further assures at least twofold discrimination distances. Thus, there is no need for the operator to determine criteria in a manual. Since relative values of the color components are calculated, the variations in the light intensity of the light source or sensor sensitivity can be fully compensated for.

BRIEF DESCRIPTION OF THE DRAWINGS

FIG. 1 is a block diagram showing the electrical construction of a color identifying system;

FIGS. 2a and 2b show a discrimination criterion preparing area in a memory for color identification;

FIGS. 4 and 5 are flow charts showing a color identifying process.

DESCRIPTION OF THE PREFERRED EMBODIMENT

Figure 3A:
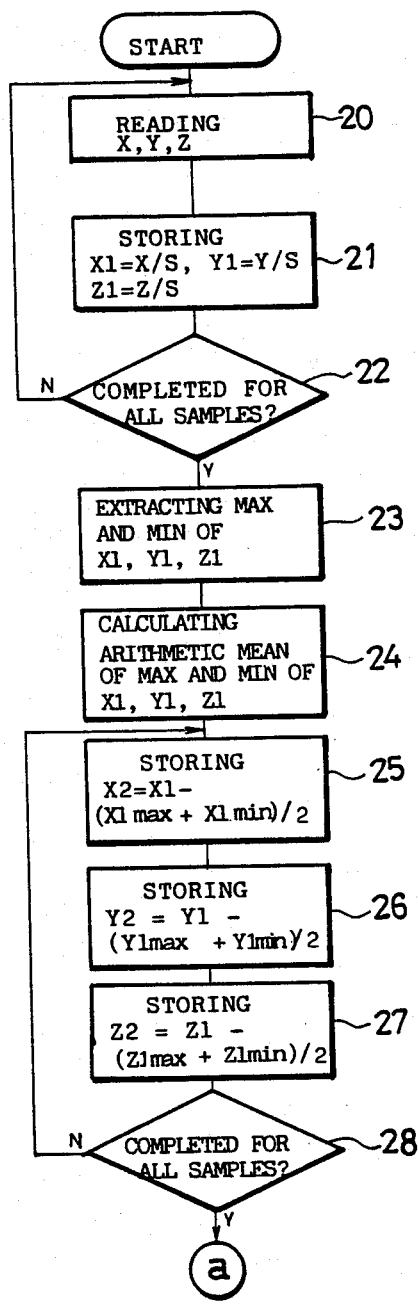
FIGS. 3–3e is a flow chart showing a process for preparing discrimination criteria.
Figure 3B:
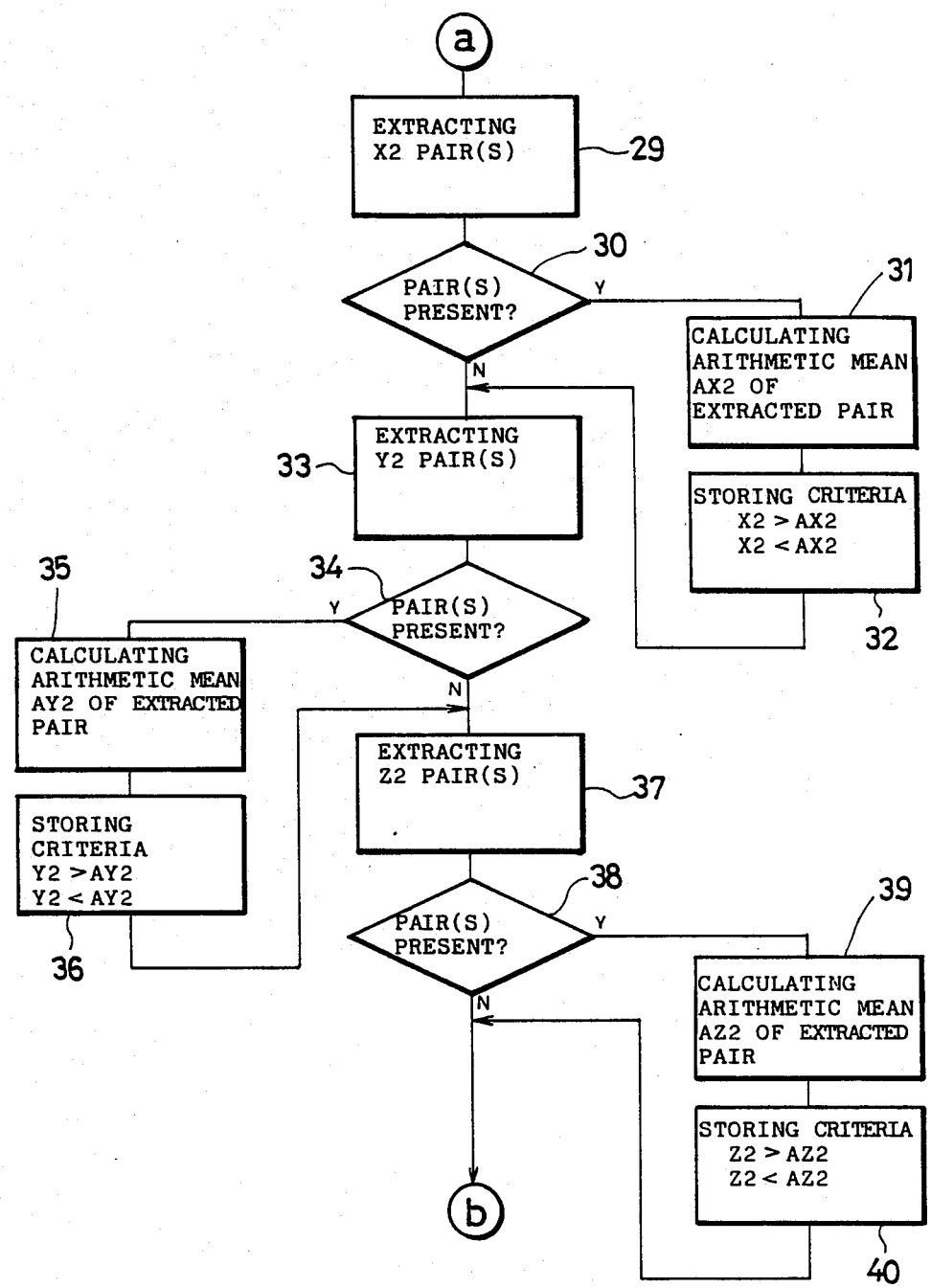
Figure 3C:
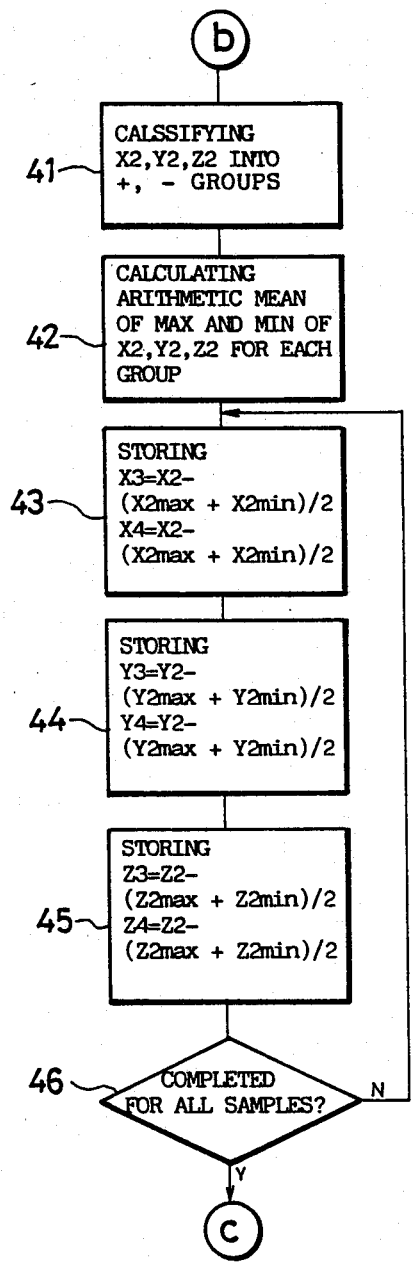
Figure 3E:
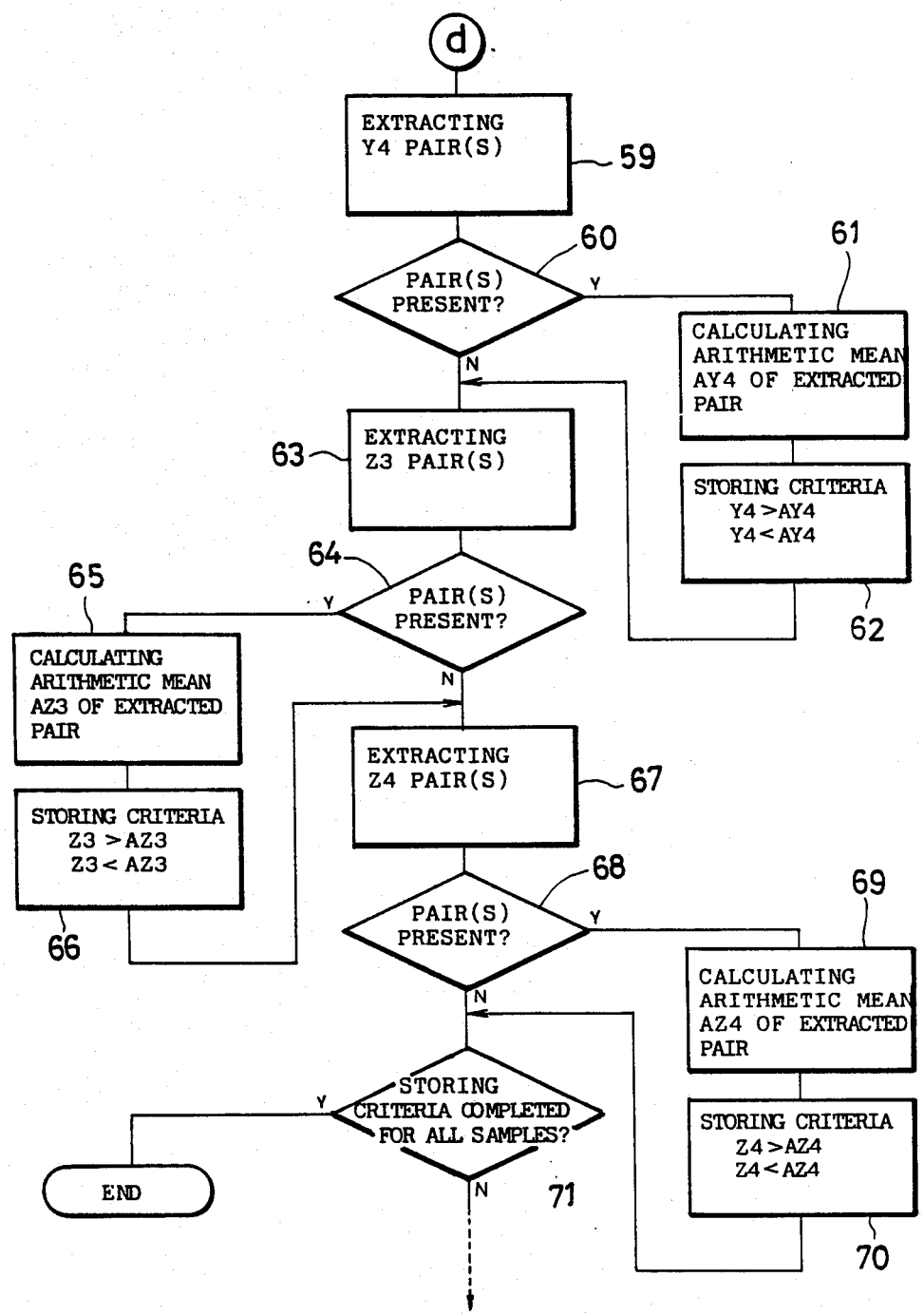

FIG. 1 generally shows the electrical construction of a color identifying system. The light of a light source (not shown) is projected on an object 1 the color of which is to be identified. The light reflected from the object is detected by a color sensor 2. The light source, which is generally incorporated in the system, may be provided independently of the system. The color sensor 2 includes sensor portions 3, 4 and 5 by which the red (R) component, green (G) component and blue (B) component of the reflected light are detected independently of one another. Each of these sensor portions 3 to 5 comprises a photoelectric converter and a narrow band color filter for passing corresponding one of R, G and B colors provided in front of the light receiving surface of the converter, or such converter and color filter monolithically formed on a single substrate, or a photoelectric converter having a high sensitivity at the wavelength of the corresponding color component. The detection signals from the sensor portions 3 to 5 are respectively amplified by amplifiers 6, converted to digital values by A/D converters 7 and then fed to a microprocessor (hereinafter referred to as "CPU") 10 by way of an input control unit 8. Connected to the CPU 10 are a memory 11 having stored therein a program for the CPU, a memory 12 adapted to store the detected data and provided with an area for preparing discrimination criteria for color identification, and a circuit 13 for generating clock pulses for determining the operation timing of the CPU 10. The CPU 10 prepares the discrimination criteria and executes a process for identifying colors with use of the discrimination criterion. The result of color identification is delivered from an output control unit 14. There is provided a button 9 for instructing the start of the criterion preparing process. The start instruction of the button 9 is sent from the input control unit 8 to the CPU 10.

FIG. 2 shows the discrimination criterion preparing area within the memory 12, and FIG. 3 shows the criterion preparing process to be performed by the CPU 10. Color samples serving as references are used for preparing the discrimination criteria for color identification. According to the present embodiment, nine color samples, i e. red, orange, yellow, yellowish green, green, blue, purple, white and black, are used. Since the colors of the color samples are those serving as references for the identification to be performed by the present system the colors are not limited to those which can be expressed by existing terms as in the present embodiment but can be any colors in accordance with the object of identification. The object is also usable as a color sample.

First, the button 9 is depressed to instruct the start of preparation of discrimination criteria. The first color sample (for example, red) is placed by the operator in the position of detection (where the object is placed or passes). The R, G and B components of the color sample are detected by the color sensor 2, and the data is read by the CPU 10 (step 20). The items of data as to the R, G and B are represented by X, Y and Z, respectively. The sum of these components, i.e. $S = X + Y + Z$, is calculated. This is followed by the calculation of relative values of these components, i.e. $X1 = X/S$, $Y1 = Y/S$ and $Z1 = Z/S$. These items of data, X, Y, Z, S, X1, Y1 and Z1, are stored at a location, corresponding to the color sample, within the criterion preparing area (step 21). As to the red sample, for example, 325, 109, 129, 563, 57.7, 19.4 and 22.9 are given as these items of data in FIG. 2.

Subsequently, the second color sample is set in position, and items of data similar to those stated above and serving as bases are read, calculated and stored. Such a procedure is executed completely for all the color samples (step 22).

The above steps provide the data serving as bases.

Next, the maximum and minimum X1, Y1 and Z1 values are selected from among the values for all the color samples (step 23). In FIG. 2, these maximums (max) and minimums (min) are enclosed by an ellipse. For example, X1max is 55.7 for red, and X1min is 27.0 for blue. For each of X1, Y1 and Z1, the arithmetic mean of the maximum and the minimum is calculated (step 24). The arithmetic mean for X1 is represented by $(X1max + X1min)/2$. The same is true of Y1 and Z1.

The deviation (primary deviation) of X1 for each color sample from the above arithmetic mean, i.e. $X1 - (X1max + X1min)/2$, is calculated, and the value is stored in the criterion preparing area as X2 (steps 25 and 28). The same procedure is repeated for Y1 and Z1 to calculate and store $Y2 = Y1 - (Y1max + Y1min)/2$ and $Z2 = Z1 - (Z1max + Z1min)/2$ (steps 26 to 28).

The sequence now proceeds to the steps of determining discrimination criteria for color identification. As to the X1 values given in FIG. 2, four colors have positive values and five colors have negative values. First in respect of the positive X2 values for the four colors, pairs of X2 values are extracted from these values, such that each value of the pairs has at least twofold discrimination distance from the value of any other color (step 29). For example, X2 for yellow is +6.9, and X2 for yellowish green is +1.3. Since $1.3 \times 2 = 2.6$, there is more than twofold discrimination distance between yellow and yellowish green. The value +1.3 for yellowish green is the smallest of all the positive X2 values, so that there is no X2 value which is smaller. However, in the case of yellow, $6.9 \times 2 = 13.8$, and this yellow value does not have at least twofold discrimination distance from +13.4 for orange. Accordingly, yellow and yellowish green is not such a pair that each value thereof has at least twofold discrimination distance from the value of any other color.

If the X2 value of 13.4 for orange were absent, +15.3 for red and +6.9 for yellow, as well as +6.9 for yellow and +1.3 for yellowish green, can be the above-mentioned pair apparently. In such a case, $(15.3 + 6.9)/2 = 11.1$, so that $X2 > 11.1$ is a discrimination criterion for identifying red. Further $(6.9 + 1.3)/2 = 4.1$, so that $11.1 > X2 > 4.1$ is a discrimination criterion for identifying yellow, and $4.1 > X2 > 0$ is a criterion for identifying yellowish green (steps 31 and 32).

With the present embodiment, however, the four positive values for the four colors do not include any pair each value of which has at least twofold discrimination value relative to any other color (NO for step 30). The negative X2 values similarly do not include any pair of X2 values each of which has at least twofold discrimination distance relative to any other color. Consequently, steps similar to the above are executed for Y2.

The Y2 values include positive values for four colors and negative values for five colors. In either case, these values do not include such a pair that each Y2 value has at least twofold discrimination distance relative to any other color (steps 33 and 34).

Among the Z2 values, there are positive values for two colors and negative values for seven colors. The positive Z2 values are +13.9 for blue and +2.3 for purple. The discrimination distance between these values is greater than +2.3×2 (steps 37 and 38). Accordingly the arithmetic mean of these values is calculated, i.e. (13.9+2.3)/2=8.1 (step 39). Thus, blue can be discriminated by the criterion of Z2>8.1, and purple by the criterion of 8.1>Z2>0. These criteria are stored in the criterion preparaing area (step 40). There is no pair to be extracted from among the negative Z2 values.

To explore the discrimination criteria for the other colors, the color samples are classified into a group of positive X2 values and a group of negative X2 values. The X2 value is positive for red, orange, yellow and yellowish green, which therefore belong to the positive group. The X2 value is negative for green, blue, purple, white and black, which belong to the negative group. Similarly, the Y2 values, as well as the Z2 values, are divided into a group of positive values and a group of negative values (step 41). For each group, the maximum and minimum are selected from among the values belonging to the group, and the arithmetic mean of the maximum and minimum is calculated (step 42).

Next, for the group of positive X2 values, the deviation (secondary deviation) of each value from the arithmetic mean of the maximum and minimum of the group is determined. Thus, when this deviation is represented by X3, X3 is given by X3=X2− (X2max+X2min)/2 where X2 is the value belonging to the positive group, and X2max and X2min are the maximum and minimum of the positive group. Similarly for the negative X2 group, the deviation of each value from the arithmetic mean of the maximum and minimum of the group is determined, i.e. X4=X2− (X2max+X2min)/2. These deviations X3 and X4 are stored in the criterion preparing area (steps 43 and 46).

Exactly the same calculations as above are performed for Y2 and Z2. Thus new items of deviation data Y3, Y4, Z3 and Z4 are determined from Y2 and Z2 values and stored (steps 44 to 46). FIG. 2 shows the X3, X4, Y3, Y4, Z3 and Z4 values thus calculated.

The same procedures as followed with use of X2 to Z2 are executed with use of X3 to Z4 to check whether it is possible to determine discrimination criteria based on whether there is at least twofold discrimination distance and, if possible, to store the criteria.

The process to be practiced will be described only in connection with the specific data shown in FIG. 2.

In the case of X3, −1.4 for yellow and −7 for yellowish green fulfil the requirement that there should be at least twofold discrimination distance (steps 47 and 48). Accordingly the mean of these value, −4.2, is calculated to determine the discrimination criterion of 0>X3>−4.2 for identifying yellow and the criterion of X3<−4.2 for yellowish green (steps 49 and 50).

The X4 values include no pair that fulfil the requirement of having at least twofold discrimination distance (NO for step 52).

The Y3 values include none which fulfil the above requirement (NO for step 56).

As to Y4, +0.15 for blue and +3.4 for black have at least twofold discrimination distance therebetween, and the discrimination criterion for blue has already been determined by Z2. Accordingly the arithmetic means of these values, i.e. 1.8, is calculated to give the criterion of Y4>+1.8 for identifying black.

Further there is at least twofold discrimination distance between −3.45 for red, −1.35 for orange and −0.45 for purple, while the criterion for purple is already given by Z2. Accordingly the arithmetic mean of −3.45 for red and −1.35 for orange, i.e. −2.4, is calculated to determine the criterion of Y4<−2.4 for red. Further the arithmetic mean of −1.35 for orange and −0.45 for purple, i.e. −0.9, is calculated to obtain the criterion of −0.9>Y4>−2.4 for orange (steps 59 to 62).

There is no data for Z3, hence no need of processing therefor (steps 63 to 66), because discrimination criteria are already determined as to the positive Z2 data (blue and purple). In such a case, step 45 can be dispensed with.

As to Z4, there is at least twofold discrimination distance between +5.25 for green, +0.25 for white and +1.35 for black, while the criterion for black is already given with use of Y4. Accordingly the arithmetic mean of green (+5.25) and black (+1.35), i.e. +3.3, is used to give the criterion of Z4>+3.3 for green. Further the arithmetic mean (+0.8) of white (+0.25) and black (+1.35) is used for determining the criterion of 0<Z4<+0.8 for white (steps 67 to 70).

With the present embodiment, discrimination criteria are set for all the color samples by the above process. However, when there are color samples for which no criteria are set, X3 to Z4 are further used to determine the arithmetic mean of the maximum and minimum of each of positive and negative groups thereof, followed by the calculation of deviation (tertiary deviation) of each value of X3 to Z4 from the arithmetic mean concerned. With use of the new deviation data, the criteria for the color samples to be determined are obtained. When the criteria for all the color samples have been set, the criterion preparing process is completed (step 71).

In the embodiment described, the procedure is omitted for checking whether the X1, Y1 and Z1 values include pairs having at least twofold discrimination distance between the values concerned. However, it is of course desirable to perform steps, similar to steps 29 to 40, for X1, Y1 and Z1. Although the arithmetic mean of a maximum and a minimum is used as the basis for obtaining deviations, the geometrical mean thereof is of course usable as the basis. The steps of determining the discrimination criteria, although performed in the order of X→Y→X, may be executed in a desired order, for example, in an order which assures ease of criterion setting.

The foregoing embodiment uses the divided groups of positive values and negative values and is based on the premise that there is a considerable discrimination distance between the groups. However, it appears likely that the discrimination distance between a very small positive value and a similarly very small negative value is small. As to Z2, for example, −0.7 for green and +2.3 for purple have a relatively small discrimination distance therebetween. When there are such values which are close to 0, it is desirable to prepare criteria under a certain additional condition. For this purpose, for example, a specified percent value of the arithmetic mean of a maximum and minimum is calculated to determine a range of the specified percent taken on positive and negative sides of zero to set up the condition that when data is present within this range, it is impossible to set a criterion involving 0 (e.g. 0<Z2<+8.1).

FIG. 4 shows a process for identifying colors with use of the discrimination criteria thus prepared. The detection signals produced from the sensor portions 3 to 5 of the sensor 2 for an object are read (step 81). The R, G and B components as to the object are represented by small characters x, y and z, respectively. From these items of data, the sum $s=x+y+z$, relative values $x1=x/s$, $y1=y/s$, $z1=z/s$ and primary deviations x2, y2, z2 are calculated, and the values are stored in the memory 12. In this procedure, x2, y2 and z2 are calculated with use of the arithmetic means of maximum and minimum values used for preparing the criteria. For example, x2 is given by $x1-(X1max+X1min)/2$. The same is true of y2 and z2.

Figure 5:
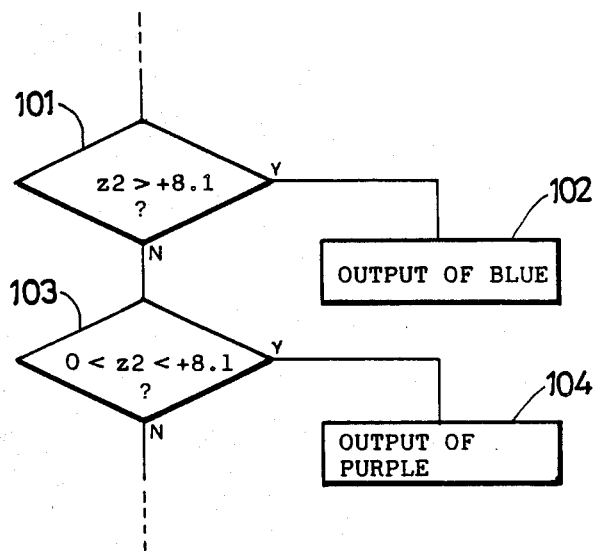

The criterion preparing area of the memory 12 is checked as to whether criteria for x2, y2, z2 are present (step 83). According to the present embodiment, the criteria for blue and purple are determined with use of z2, so that discrimination processing is conducted with use of the criteria. More specifically, when the criterion of $z2>8.1$ is satisfied, identifying output of blue is given via the output control unit 14 as seen in FIG. 5 (steps 101, 102). Further when the requirement of $0<z2<8.1$ is fulfilled, identifying output of purple is given (steps 103, 104). When neither of the criteria are met, the next step follows.

Subsequently, secondary deviations x3, y3, z3 are calculated with use of x2, y2 and z2 and are stored in the memory 12 (step 85). In this step, x3, y3 and z3 are calculated with use of the arithmetic means of maximum and minimum values in the positive groups used for preparing the foregoing criteria. Step 86 checks whether discriminations criteria are present for x3, y3 and z3. Since x3 is used in the criteria for yellow and yellowish green in the present embodiment, the calculated x3 value is checked as to whether it meets the criteria (step 87). If one of the criteria is fulfilled, output of yellow or yellowish green is given accordingly.

Steps 85 and 86 may be reversed to check whether criteria for x3, y3 and z3 are available, and if the answer is affirmative, the secondary deviation may be calculated only for the component (i.e. x3 in the present embodiment) corresponding to the available criteria.

Similarly secondary deviations x4, y4 and z4 are calculated with use of maximum and minimum arithmetic means of negative groups of X2, Y2 and Z2 values (step 88). Discrimination processing is performed similarly with use of criteria as to x4, y4 and z4 (steps 89, 90). In the present embodiment, red, orange, green, white and black will be discriminated.

When x2, y2 and z2 are positive, it is desirable to perform steps 85 to 87 only, while when they are negative, steps 88 to 90 only are preferably performed.

Step 91 checks whether there are discrimination criteria using deviations of higher order. If the answer is affirmative, deviations of higher order are similarly calculated, and color discrimination processing is performed with use of calculated values. Since criteria using deviations of higher order are not present in the case of the present embodiment, the sequence is terminated with step 90.

What is claimed is:

1. In a color identifying system including a color sensor for detecting light from an object and delivering signals representing a plurality of color components, and a processing device for receiving the signals from the color sensor and for preparing therefrom color identifying discrimination criteria and for performing a color identifying process based on color component values represented by the signals, a process performed by said processing device for preparing said discrimination criteria, the process comprising the steps of:
   reading values representing a plurality of color components delivered from the color sensor for each of a plurality of given reference colors,
   calculating relative values of the color components,
   calculating the deviation of the relative value of each color component from a specified value,
   extracting pairs of deviations each having a discrimination distance of at least specified times relative to any other reference color,
   determining a discrimination criterion between the extracted pair of deviations, and
   repeating the extracting and determining steps by calculating deviations of higher order with use of lower order deviations until said discrimination criteria are determined for all the given reference colors.

2. A process as defined in claim 1 which comprises:
   extracting the relative values having a discrimination distance of at least specified times relative to any other reference color,
   determining a discrimination criterion between a pair of extacted relative values, and
   performing the step of calculating the deviation to establish discrimination criteria for the reference colors for which the discrimination criteria have not been determined.

3. A process as defined in claim 1 wherein when there are positive and negative deviation values for one color component, the deviation values are classified into a positive group and a negative group, and pairs of deviation values having a discrimination distance of at least specified times are extracted for each group.

4. A process as defined in claim 1, wherein said at least specified times is at least two times.

5. A color identifying system for automatically preparing discrimination criteria for color identification comprising:
   a color sensor for detecting light from an object and delivering signals representing a plurality of color components,
   means for calculating relative values of the color components from the signals from the color sensor,
   means for calculating the deviation of the relative value of each color component from a specified value,
   means for extracting pairs of deviations each having a discrimination distance of at least specified times relative to any other reference color,
   means for determining a discrimination criterion between the extracted pair of deviation, and
   control means for repeating the extracting and determing procedures by calculating deviations of higher order with use of lower order deviations until discrimination criteria are determined for all the given reference colors.

6. A system as defined in claim 5 which comprises:
   means for extracting the relative values having a discrimination distance of at least specified times relative to any other reference color,
   means for determining a discrimination criterion between a pair of extracted relative values, and
   control means for permitting the calculation of the deviation to establish discrimination criteria for the reference colors for which the discrimination criteria have not been determined.

7. A system as defined in claim 5 wherein when there are positive and negative deviation values for one color component, said extracting means classifies deviation values into a positive group and a negative group and extracts pairs of deviation values having a discrimination distance of at least specified times for each group.

8. A system as defined in claim 5, wherein said at least specified times is at least two times.

* * * * *